C. A. Harper.
Imp'd Cultivator.
N° 73181    Patented Jan. 7, 1868.

Witnesses
Theo Tusche
J. A. Fraser

Inventor
C. A. Harper
Per Munn & Co
Attorneys

United States Patent Office.

C. A. HARPER, OF WHEELING, INDIANA.

Letters Patent No. 73,181, dated January 7, 1868.

IMPROVEMENT IN CULTIVATORS.

*The Schedule referred to in these Letters Patent and making part of the same.*

TO ALL WHOM IT MAY CONCERN:

Be it known that I, C. A. HARPER, of Wheeling, in the county of Delaware, and State of Indiana, have invented a new and improved Cultivator; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
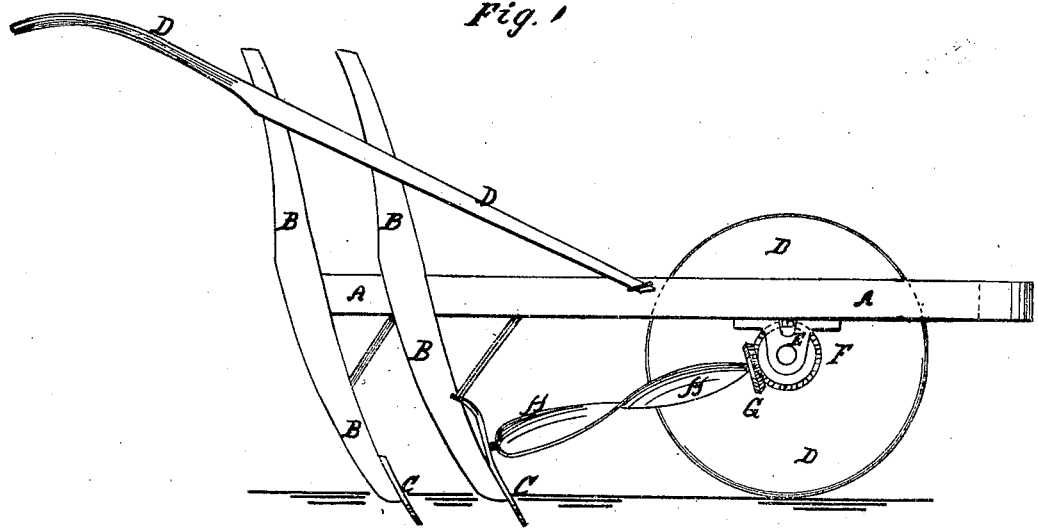
Figure 1 is a side view of my improved cultivator.
Figure 2:
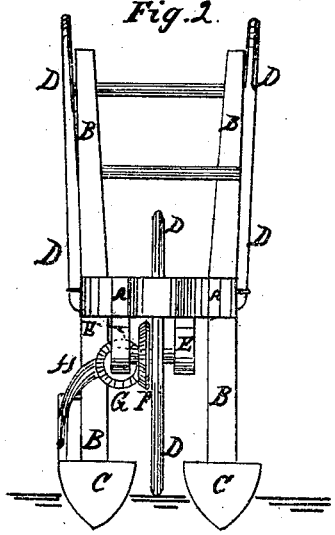
Figure 2 is a front view of the same.

My invention has for its object to furnish an improved cultivator, so constructed and arranged as to remove the clods and rubbish in front of the plough, so that they may not be thrown against or upon the small plants being cultivated, and which will enable the ploughs to be much more easily raised to pass over stumps and other obstructions, and to be more easily transported from place to place; and it consists in the combination of a spiral or screw-plate and wheel with the cultivator or plough-frame, as hereinafter more fully described.

A is the horizontal frame or beams of the cultivator, B are the plough-standards, C are the ploughs, and D are the handles, about the construction of which parts there is nothing new. D' is a wheel, the axle of which revolves in bearings E attached to the frame or beams A. The wheel D' should be of such a size as to roll along the ground while the ploughs are working, and should be placed so far forward as not to interfere with the working of the ploughs, allowing them to be run at a greater or less depth, as may be desired, and so that, by raising the rear part of the cultivator, its weight may be mostly supported upon the wheel, for convenience in passing over or around stumps, roots, and other obstructions, and for convenience in turning at the end of the rows, and in passing from one field to another. To the side of the wheel D' is securely attached or upon it is formed a small bevel-gear wheel, F, the teeth of which mesh into the teeth of the bevel-gear wheel G attached to the forward end of the spiral or screw-plate H. The forward end of the spiral plate H is pivoted to one of the bearings E, or to some suitable support attached to the frame A, and its rear end is pivoted to the plough-standard B, or to an arm or other support attached to the plough-standard B, or to the plough C, or to both, in such a position that, as the machine is advanced, it may brush away the clods and other rubbish from before the plough, and thus prevent their being thrown against or upon the small plants, and also prevent the plough from becoming choked. After the plants have become larger, so that they will not be injured by the clods thrown against them by the plough, the spiral plate need not be used.

It should be observed that my improvement may be attached to a cultivator having one, two, three, or any number of ploughs, with equal facility and advantage.

Having thus described my invention, I claim as new, and desire to secure by Letters Patent—

1. The combination of the wheel D' with the cultivator-frame A, substantially as herein shown and described, and for the purpose set forth.

2. The combination of the spiral or screw-plate H with the wheel D', and with the cultivator-frame A B, ubstantially as shown and described, and for the purpose set forth.

The above specification of my invention signed by me, this 5th day of November, 1867.

C. A. HARPER.

Witnesses:
 WILLIAM D. CLEMENS,
 WM. HENRY BABBITT.